United States Patent

Korin

[11] Patent Number: 5,529,689
[45] Date of Patent: Jun. 25, 1996

[54] REPLACEABLE INTEGRATED WATER FILTRATION AND STERILIZATION CARTRIDGE AND ASSEMBLY THEREFOR

[76] Inventor: Amos Korin, 16 Mountain View, Weston, Conn. 06883

[21] Appl. No.: 310,955

[22] Filed: Sep. 23, 1994

[51] Int. Cl.⁶ .................................................. C02F 1/48
[52] U.S. Cl. ................... 210/232; 210/443; 422/186.3; 250/432 R; 250/436
[58] Field of Search .................. 210/748, 452, 210/443, 232; 250/432 R, 435–438; 422/186.3

[56] References Cited

U.S. PATENT DOCUMENTS

| | | | |
|---|---|---|---|
| 2,221,465 | 11/1940 | Aldham | 210/452 |
| 3,398,835 | 8/1968 | Offer | 210/452 |
| 3,696,932 | 10/1972 | Rosenberg | 210/437 |
| 3,859,216 | 1/1975 | Sisson et al. | 210/452 |
| 4,834,885 | 5/1989 | Misgen et al. | 210/452 |
| 4,892,712 | 1/1990 | Robertson et al. | 422/186 |
| 4,969,994 | 11/1990 | Misgen et al. | 210/452 |
| 5,178,758 | 1/1993 | Hwang | 210/256 |
| 5,266,215 | 11/1993 | Engelhard | 210/748 |
| 5,342,519 | 8/1994 | Friedmann et al. | 210/452 |

*Primary Examiner*—Neil McCarthy
*Attorney, Agent, or Firm*—Ohlandt, Greeley Ruggiero & Perle

[57] ABSTRACT

A filtration/sterilization assembly which comprises: a filtration housing comprising a base unit and an outer housing, the base unit comprises a permeate channel, a port for removing permeate from the permeate channel, a feed channel disposed about the permeate channel, and a port for feeding a feed stream into the feed channel; and an integrated filtration and sterilization cartridge replaceably disposed within the filtration housing; wherein the outer housing is disposed about the cartridge so as to form a feed chamber between the inner surface of the outer housing and the outer surface of the filtration member and wherein the feed chamber is in contact with the feed channel of the base unit, and wherein permeate from the cartridge is passed through to the permeate channel for discharging from the assembly.

27 Claims, 5 Drawing Sheets

REPLACEABLE INTEGRATED WATER FILTRATION AND STERILIZATION CARTRIDGE AND ASSEMBLY THEREFOR

The present invention relates generally to a replaceable integrated water filtration and sterilization cartridge and housing assembly therefor which is capable of removing particulates, organic materials, inorganic materials and/or heavy metal materials from a water stream, while also sterilizing the filtered water stream to destroy most microorganisms, bacteria and viruses contained therein.

BACKGROUND OF THE INVENTION

As environmental agencies become more aware of the potential health risks associated with drinking either municipal or well water, there has been an every increasing need for residential water purification systems which are capable of removing organics, inorganics, particulates, microorganisms, bacteria and viruses from the water supply prior to consumption. Most conventional systems require a series of filtration and chlorification units to properly remove such matters from the water. These units are extremely costs to install and maintain, and take up a lot of space making them unfit for countertop use.

Filtration media has been used for years to remove particulates from the water supply, while carbon block filters have been effective in removal of organics and inorganics. However, conventional filters are incapable of removing microorganisms such as bacteria, viruses, yeasts or molds. Ultraviolet radiation in the 200–300 nanometer range have been extremely effective in killing such microorganisms. As such, germicidal lamps have been used extensively in air and water purification, sewage treatment, protection of food and beverages, and other disinfection and sterilization applications.

Recent efforts by filtration manufacturers have resulted in the creation of a water purification system which combines the disinfection and sterilization capabilities of ultraviolet radiation with the particulate, organic and inorganic filtering capabilities of conventional filter media. This combined system provides extremely pure and sterilized drinking water regardless of the origin of the water source.

These conventional two stage water purification systems typically include an ultraviolet lamp affixed to the base unit of a filtration housing assembly and protected by a stainless steel sheath or sleeve. A conventional carbon block filter is removably slid over the outside of the sleeve and then the filter housing is placed over the carbon filter and screwed into the base. Typically, the ultraviolet lamp is placed within a quartz tube and replaceable mounted to the base.

Two stage water purification systems as discussed above require periodic maintenance such as replacing the carbon block filter approximately every six months (more frequently if needed), replacing the ultraviolet lamp every twelve months to insure proper performance (i.e., lamp may not burn-out, but disinfection capacity does diminish over time), and quartz tube should be cleaned every six months. Although the carbon block filter is easy to replace, i.e., simply unscrew the filter housing and slide the filter off the stainless steel sleeve at the open end, replacement of the ultraviolet lamp requires substantial disassembly of the base unit of the housing. Since the ultraviolet lamp replacement is extremely difficult, many end-users (i.e., homeowners) will tend to not replace such lamps as frequently as necessary. If the lamp is not replaced on a periodic basis its effectiveness in disinfecting and sterilizing water will diminish over time, thus posing a health risk to unwary end-users.

Therefore, it would be highly desirable to have a two stage water purification system which allows for easy removal and replacement of both the filter and the ultraviolet lamp. In this regard, the present inventor has developed a unique replaceable integrated filtration/sterilization cartridge which is readily and easily removable from the filter housing assembly. This integrated filtration/sterilization cartridge comprises both the ultraviolet lamp and filter member together as one single unit which may be removed from the base unit of the housing assembly without the need for any tools or detailed instructions. Moreover, the concept of combining the filter member and the ultraviolet lamp in a single replaceable cartridge will cause the unsophisticated homeowner or end-use to replace both elements at the same time, thereby avoiding the inherent health risks of leaving a still illuminating, but less effective, ultraviolet lamp within the filter assembly.

The present invention also provides many additional advantages which shall become apparent as described below.

SUMMARY OF THE INVENTION

A filtration/sterilization assembly which comprises: a filtration housing comprising a base unit and an outer housing, the base unit comprises a permeate channel, a means for removing permeate from the permeate channel, a feed channel disposed about the permeate channel, and a means for feeding a feed stream into the feed channel; and an integrated filtration and sterilization cartridge which comprises: a first end plate and a second end plate; an ultraviolet lamp affixed to the first end plate; and a filtration member disposed between the first and second end plates, the filtration member being affixed to both the first and second end plates and disposed about the ultraviolet lamp thereby forming a permeate chamber between the ultraviolet lamp and the inner surface of the filtration member, and wherein the first end plate comprises at least one permeate through-hole disposed therein and in contact with both the permeate chamber and the permeate channel; the outer housing is disposed about the integrated filtration and sterilization cartridge so as to form a feed chamber between the inner surface of the outer housing and the outer surface of the filtration member and wherein the feed chamber is in contact with the feed channel of the base unit.

Another embodiment according to the present invention involves an in-line filtration/sterilization assembly which is capable of being replaceably mounted directly within a feed stream. The assembly comprises a filtration housing comprising a base unit and an outer housing. The base unit comprises a means for removing permeate from the assembly, and the outer housing comprises a means for feeding the feed stream into the assembly. The integrated filtration and sterilization cartridge comprises: a first end plate and a second end plate; an ultraviolet lamp affixed to the first end plate; and a filtration member disposed between the first and second end plates, the filtration member being affixed to both the first and second end plates and disposed about the ultraviolet lamp thereby forming a permeate chamber between the ultraviolet lamp and the inner surface of the filtration member. The outer housing is disposed about the integrated filtration and sterilization cartridge so as to form a feed chamber between the inner surface of the outer housing and the outer surface of the filtration member and wherein the feed chamber is in contact with the means for feeding the feed stream into the assembly. The base unit is disposed at the opposite end of the cartridge as the outer housing so as to form a permeate compartment between the inner surface of the base unit and the outer surface of the first end plate, and wherein the permeate compartment is in contact with the means for removing permeate from the assembly and the first end plate comprises at least one permeate through-hole disposed therein and in contact with both the permeate chamber and the permeate compartment.

Other and further objects, advantages and features of the present invention will be understood by reference to the following specification in conjunction with the annexed drawings, wherein like parts have been given like numbers.

DESCRIPTION OF THE PREFERRED EMBODIMENTS

Figure 1:
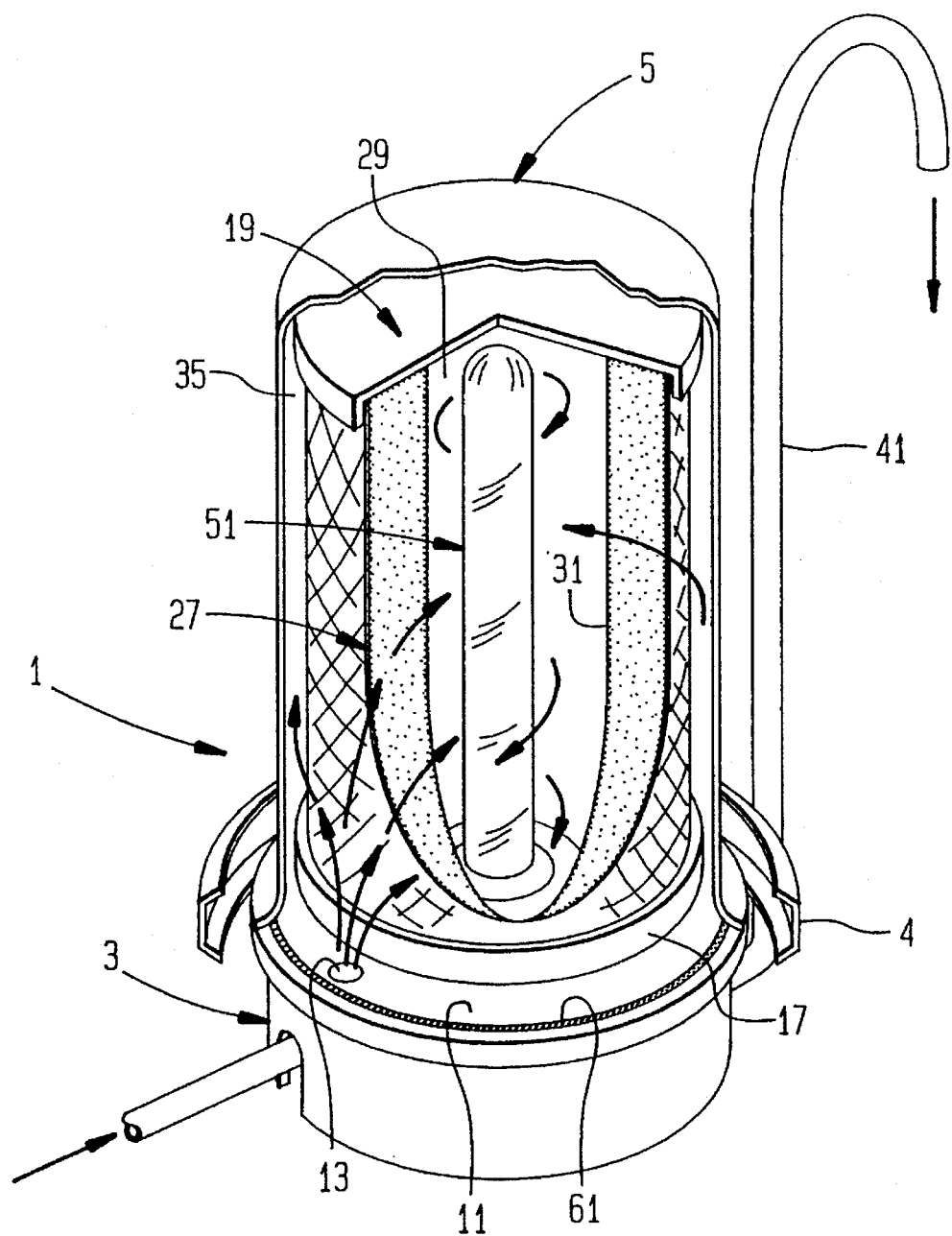
FIG. 1 is a schematic front-top perspective view of the filtration/sterilization housing assembly according to the present invention.
Figure 3:
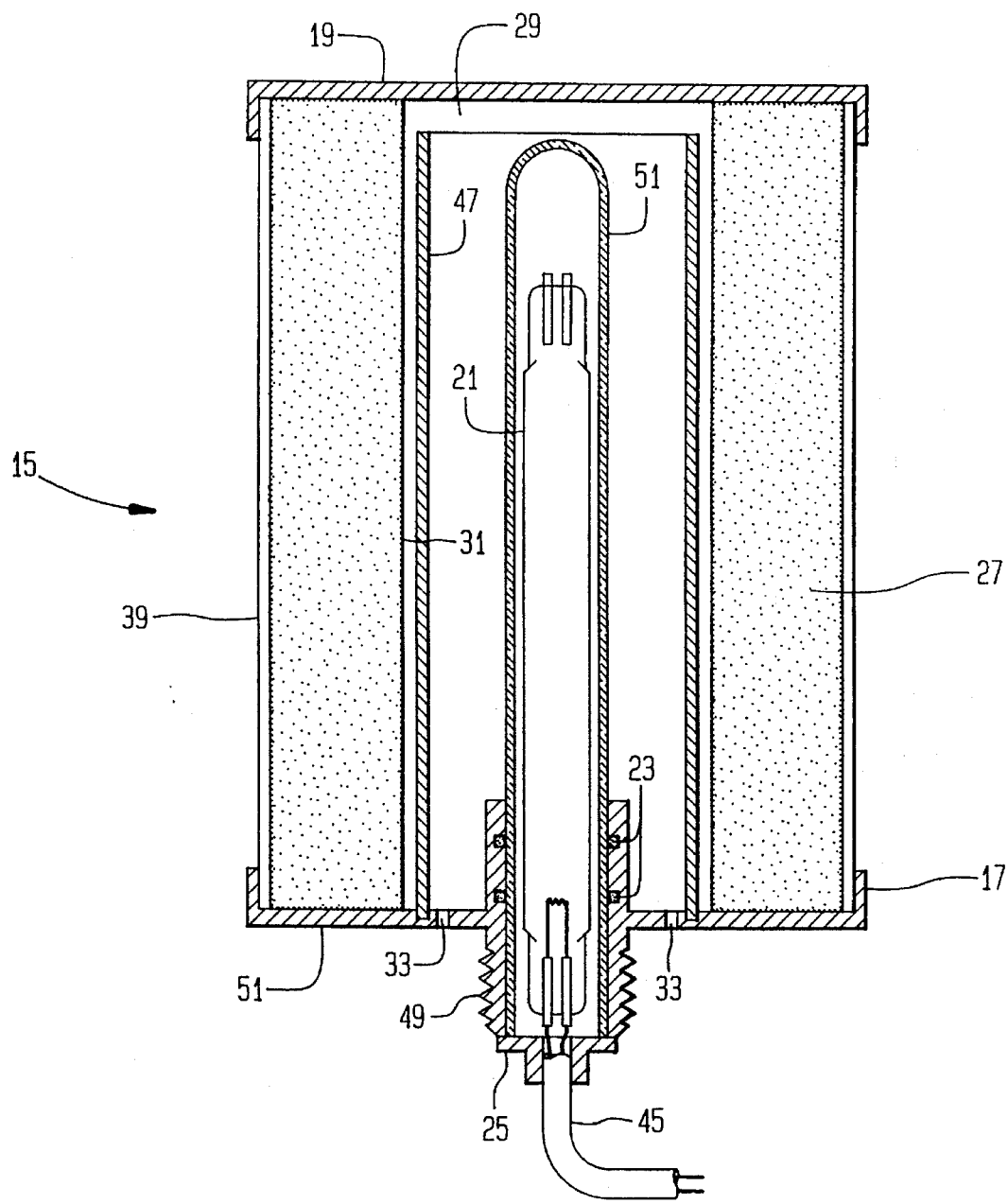
FIG. 3 is a schematic cross-sectional view of the filtration/sterilization cartridge removably disposed within a housing assembly according to the present invention.

The present invention can best be described by referring to the drawings attached hereto wherein FIGS. 1 and 3 depict a filtration/sterilization assembly which comprises: a filtration housing 1 comprising a base unit 3 and an outer housing 5. Base unit 3 comprises a permeate channel 7, a means 9 for removing permeate from permeate channel 7, a feed channel 11 disposed about permeate channel 7, and a means 13 for feeding a feed stream into feed channel 11.

Figure 2:
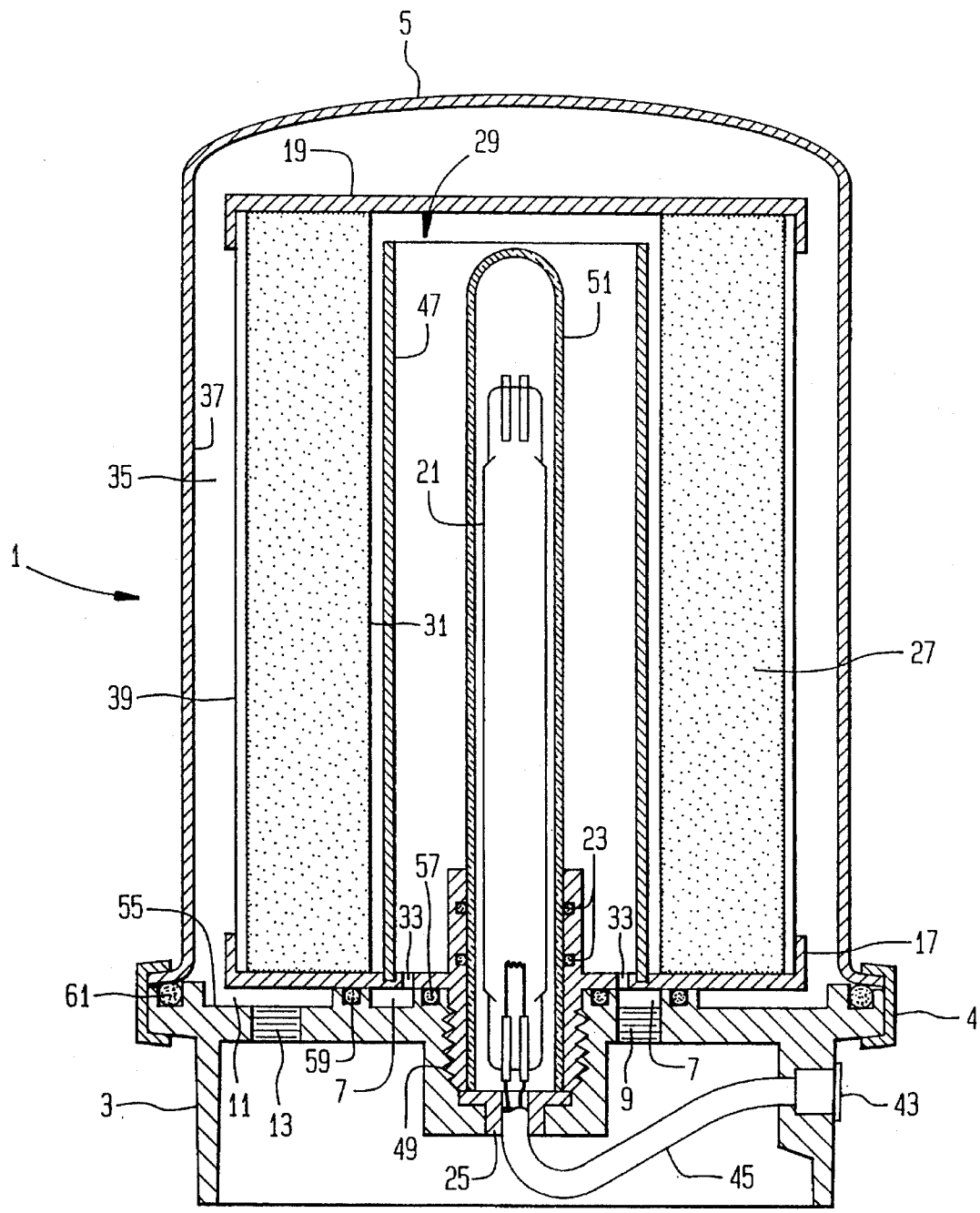
FIG. 2 is a schematic cross-sectional view of the integrated filtration/sterilization cartridge according to the present invention.
Figure 5:
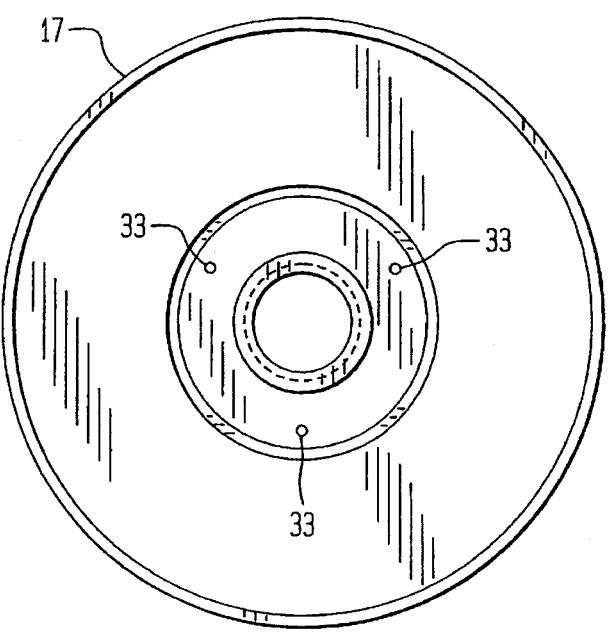
FIG. 5 is a top planar view of the lower end plate of the filtration/sterilization cartridge according to the present invention.
Figure 6:
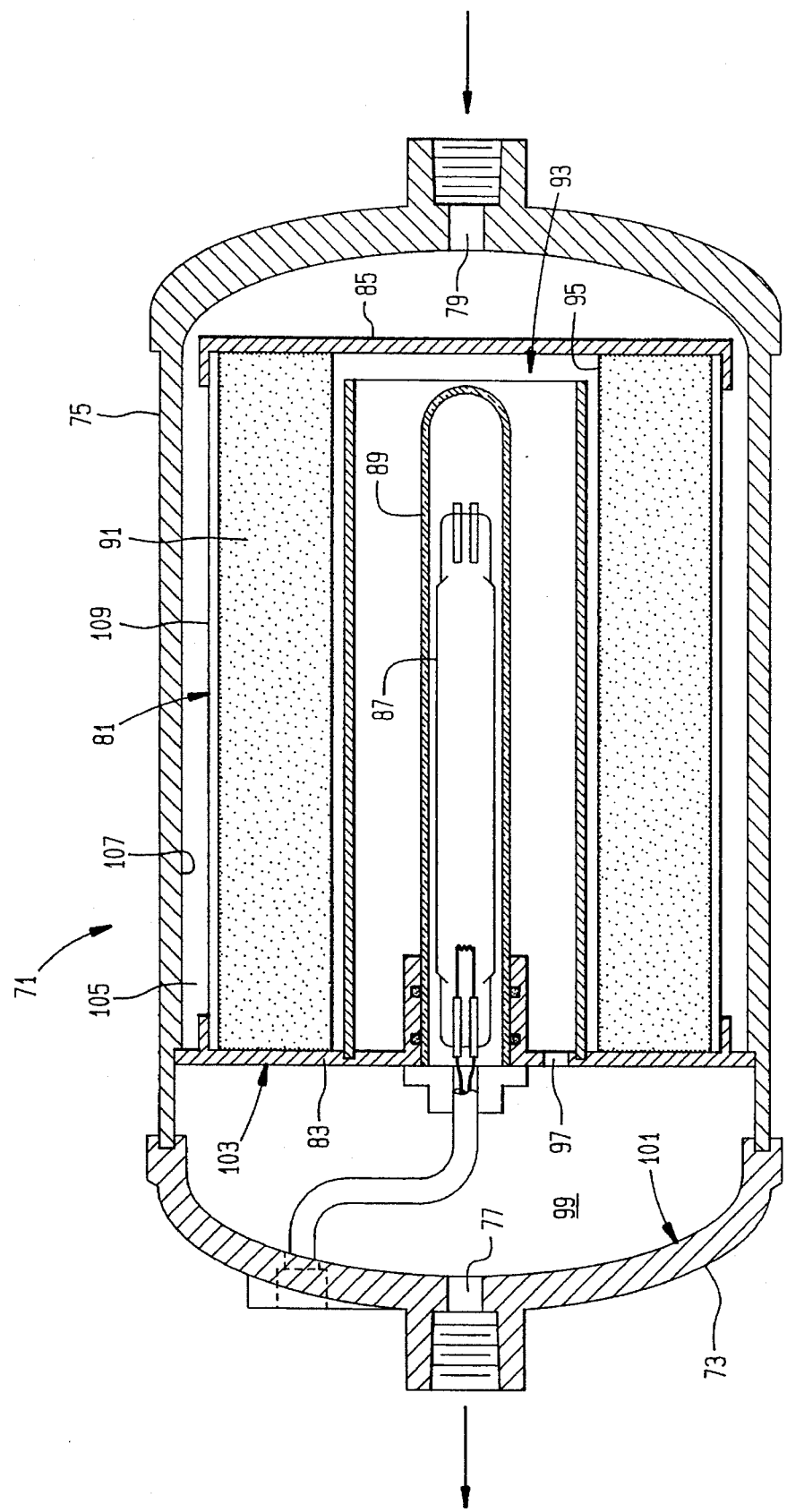
FIG. 6 is a schematic cross-sectional view of a replaceable housing assembly disposed in-line within a conduit of a water stream to be treated thereby according to another embodiment of the present invention.

The integrated filtration and sterilization cartridge can best be show by reference to FIG. 2, wherein cartridge 15 comprises: a first end plate 17 and a second end plate 19; an ultraviolet lamp 21 affixed to first end plate 17 by o-rings 23 and end cap 25; and a filtration member 27 disposed between first and second end plates (17, 19). Filtration member is preferably affixed to both first and second end plates (17,19) and disposed about ultraviolet lamp 21 thereby forming a permeate chamber 29 between ultraviolet lamp 21 and inner surface 31 of filtration member 27, and wherein first end plate 17 comprises at least one permeate through-hole 33 (as shown in FIG. 5) disposed therein and in contact with both permeate chamber 29 and permeate channel 7.

Outer housing 5 is disposed about integrated filtration and sterilization cartridge 15 so as to form a feed chamber 35 between inner surface 37 of outer housing 5 and outer surface 39 of filtration member 27 and wherein feed chamber 35 is in contact with feed channel 11 of base unit 3.

Base unit 3 also has attached thereto a means 41 for dispensing the permeate. Dispensing means 41 is connected to port or means 9 which is connected to permeate channel 7. Dispensing means 41 can be a conduit formed from any rigid or semi-rigid material, such as stainless steel or plastic. Base unit also includes a means 43 for supplying power to ultraviolet lamp 21 via electric cable 45. Means 43 can be a modular or snap-type socket such that electric cable 45 can be easily unplugged from means 43 so that cartridge 15 can be readily removed from base 3 upon removal of outer housing 5.

Cartridge 15 may also include a counter current sleeve 47 disposed between ultraviolet lamp 21 and inner surface 31 of filtration member 27. Sleeve 47 can be formed from any of the following: stainless steel, Teflon® (a registered trademark of dupont), any ultraviolet-resistant polymeric material, and the like. When sleeve 47 is used, permeate through-hole 33 should be disposed such that it is between sleeve 47 and ultraviolet lamp 21, and still in contact with permeate chamber 29. Ultraviolet lamp 21 is preferably disposed within a protective quartz tube 51. Ultraviolet lamp 21 should be one which is capable of producing radiation in the 200–300 nanometer range in order to effectively kill most microorganism such as airborne and surface bacteria, viruses, yeasts and molds.

Filter member 27 is typically affixed to first and second end plates (17, 19) by means of any chemical adhesive material. Although any mechanical or other conventional means of securing filter member 27 to first and second end plate (17, 19) is also contemplated herein. Filter member 27 can be formed from at least one material selected from the group consisting of: activated carbon, adsorption resins, ion exchange resins, zeolite, reduction catalysts, paper, polymers, clay, ceramics, metals, nylon, wood pulp, cellulose, cotton, fibers, and any other material capable of separating particulates, organics or inorganics from a feed stream. Filter member 27 is preferably in the form of one of the following: string wound filter, fiber composite molded filter, pleated filter, hollow fiber membrane, spiral wound membrane, plate and frame membrane and any other conventional form desired by the user.

When filter member 27 is used to remove organic materials, such as benzene, it is preferably formed of activated carbon or adsorption resin. To remove inorganic materials, such as heavy metal or sulfites, filter 27 should be formed from ion exchange resin, zeolite or a reduction catalyst.

Figure 4:
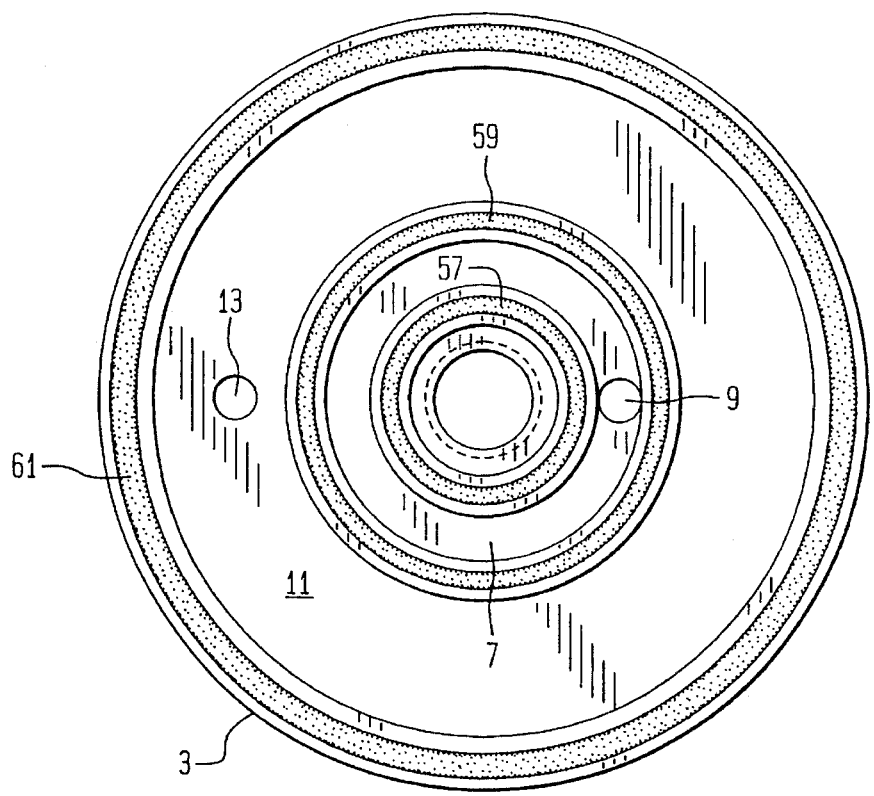
FIG. 4 is a top planar view of the base unit of the housing assembly according to the present invention.

First end plate 17 is secured to base unit 3 by means of threads 49 or any other means which is capable of forming fluid-tight fit therebetween. Outer housing 5 is secured to base unit 3 by means of a clap 4 or any other conventional means of securing these two component together, e.g., screw fitting. As cartridge 15 is secured to base unit 3 a permeate channel 7 is formed between outer surface 53 of first end plate 17 and the adjacent surface 55 of base unit 3 by means of o-rings 57 and 59 which create a fluid-tight seal between base unit 3 and first end plate 17. Similarly, a feed channel 11 is formed between outer surface 53 of first end plate 17 and the adjacent surface 55 of base unit 3 by means of o-rings 59 and 61. These o-rings (57,59,61) can be formed from any elastomeric material (e.g., rubber) or any other material which is capable of forming a fluid-tight seal between the two surfaces. The relationship of o-rings (57, 59,61), permeate channel 7 and feed channel 11 can be seen in FIG. 4.

Another embodiment according to the present invention involves an in-line filtration/sterilization assembly which is capable of being replaceably mounted directly within a conduit carrying a feed stream such as water. The assembly comprises: a filtration housing 71 which includes a base unit 73 and an outer housing 75. Base unit 73 comprises a port means 77 for removing permeate from the assembly, and outer housing 75 comprises a port means 79 for feeding the feed stream into the assembly. Disposed within filtration housing 71 is an integrated filtration and sterilization cartridge 81 which comprises: a first end plate 83 and a second end plate 85; an ultraviolet lamp 87 disposed within a quartz tube 89 and affixed to first end plate 83; and a filtration member 91 disposed between first and second end plates (83,85). Filtration member 91 is preferably affixed to both first and second end plates (83,85) and disposed about ultraviolet lamp 87 thereby forming a permeate chamber 93 between ultraviolet lamp 87 and the inner surface 95 of filtration member 91. Base unit 73 is disposed at the opposite end of cartridge 81 as outer housing 75 so as to form a permeate compartment 99 between the inner surface 101 of base unit 73 and the outer surface 103 of first end plate 83 and wherein permeate compartment 99 is in contact with port means 77 for removing permeate from the assembly. First end plate 83 comprises at least one permeate through-hole 97 disposed therein and in contact with both permeate chamber 93 and permeate compartment 99. Outer housing 75 is disposed about cartridge 81 so as to form a feed chamber 105 between the inner surface 107 of the outer housing 75 and the outer surface 109 of filtration member 91 and wherein feed chamber 105 is in contact with port means 79 for feeding the feed stream into the assembly. This in-line assembly can be readily attached to a feed stream conduit by simply threading means 79 and means 77 to portions of the conduit, or by any other conventional removable sealing means, such as snap fitting.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. An integrated water filtration and sterilization cartridge which comprises:

a first end plate and a second end plate;

a filtration member disposed between said first and second end plates, said filtration member being securely affixed to both said first and second end plates; and an ultraviolet lamp affixed to said first end plate and disposed within the interior of said filtration member such that a permeate chamber is formed between said ultraviolet lamp and the inner surface of said filtration member, wherein said first and second end plates, said filtration member and said ultraviolet lamp form an integrated unit that is removable and replaceable as a single cartridge.

2. The integrated cartridge according to claim 1 wherein said first end plate further comprises at least one permeate through-hole disposed therein and in contact with said permeate chamber.

3. The integrated cartridge according to claim 1 further comprising a counter current sleeve disposed between said ultraviolet lamp and the inner surface of said filtration member.

4. The integrated cartridge according to claim 3 wherein said first end plate further comprises at least one permeate through-hole disposed between said ultraviolet lamp and said inner surface of said filtration member and in contact with said permeate chamber.

5. The integrated cartridge according to claim 1 wherein said filter member is affixed to said first and second end plates by means of an adhesive material.

6. The integrated cartridge according to claim 1 wherein said ultraviolet lamp is disposed within a quartz tube.

7. The integrated cartridge according to claim 1 wherein said filter member is formed from at least one material selected from the group consisting of: activated carbon, adsorption resins, ion exchange resins, zeolite, reduction catalysts, paper, polymers, clay, ceramics, metals, nylon, wood pulp, cellulose, cotton, and fibers.

8. The integrated cartridge according to claim 1 wherein said filter member is in the form of one of the following: string wound filter, fiber composite molded filter, pleated filter, hollow fiber membrane, spiral wound membrane, and plate and frame membrane.

9. A filtration/sterilization assembly which comprises:

a filtration housing comprising a base unit and an outer housing, said base unit comprises a permeate channel, a means for removing permeate from said permeate channel, a feed channel disposed about said permeate channel, and a means for feeding a feed stream into said feed channel; and a replaceable and integrated water filtration and sterilization cartridge which comprises: a first end plate and a second end plate; a filtration membrane disposed between said first and second end plates, said filtration member being securely affixed to both said and second end plates; and an ultraviolet lamp affixed to said first end plate and disposed within the interior of said filtration member such that a permeate chamber is formed between said ultraviolet lamp and the inner surface of said filtration member, wherein said first and second end plates, said filtration member and said ultraviolet lamp form an integrated unit that is removable and replaceable as a single cartridge, and wherein said first end plate comprises at least one permeate through-hole disposed therein and in contact with both said permeate chamber and said permeate channel;

said outer housing is disposed about said integrated water filtration and sterilization cartridge so as to form a feed chamber between the inner surface of said outer housing and the outer surface of said filtration member and wherein said feed chamber is in contact with said feed channel of said base unit.

10. The assembly according to claim 9 wherein said base unit further comprises a means for dispensing said permeate, said dispensing means being connected to said means for removing permeate from said permeate channel.

11. The assembly according to claim 9 wherein said base unit further comprises a means for supplying power to said ultraviolet lamp.

12. The assembly according to claim 9 wherein said integrated filtration and sterilization cartridge further comprises a counter current sleeve disposed between said ultraviolet lamp and the inner surface of said filtration member.

13. The assembly according to claim 12 wherein said permeate through-hole in said first end plate is disposed between said ultraviolet lamp and said inner surface of said counter current sleeve and in contact with said permeate chamber.

14. The assembly according to claim 9 wherein said filter member is affixed to said first and second end plates by means of an adhesive material.

15. The assembly according to claim 9 wherein said ultraviolet lamp is disposed within a quartz tube.

16. The assembly according to claim 9 wherein said filter member is formed from at least one material selected from the group consisting of: activated carbon, adsorption resins, ion exchange resins, zeolite, reduction catalysts, paper, polymers, clay, ceramics, metals, nylon, wood pulp, cellulose, cotton, and fibers.

17. The assembly according to claim 9 wherein said filter member is in the form of one of the following: string wound filter, fiber composite molded filter, pleated filter, hollow fiber membrane, spiral wound membrane, and plate and frame membrane.

18. The assembly according to claim 9 wherein said permeate channel is formed between the outer surface of said first end plate and the adjacent surface of said base unit.

19. The assembly according to claim 9 wherein said feed channel is formed between the outer surface of said first end plate and the adjacent surface of said base unit.

20. An in-line filtration/sterilization assembly which is capable of being replaceably mounted directly within a feed stream, said assembly comprises:

a filtration housing comprising a base unit and an outer housing, said base unit comprises a means for removing permeate from said assembly, and said outer housing comprises means for feeding said feed stream into said assembly;

a replaceable and integrated water filtration and sterilization cartridge which comprises: a first end plate and a second end plate; a filtration membrane disposed between said first and second end plates, said filtration member being securely affixed to both said and second end plates; and an ultraviolet lamp affixed to said first end plate and disposed within the interior of said filtration member such that a permeate chamber is formed between said ultraviolet lamp and the inner surface of said filtration member, wherein said first and second end plates, said filtration member and said ultraviolet lamp form an integrated unit that is removable and replaceable as a single cartridge;

said outer housing is disposed about said integrated filtration and sterilization cartridge so as to form a feed chamber between the inner surface of said outer housing and the outer surface of said filtration member and wherein said feed chamber is in contact with said means for feeding said feed stream into said assembly, and wherein said base unit is disposed at the opposite end of said cartridge as said outer housing so as to form a permeate compartment between the inner surface of said base unit and the outer surface of said first end plate, and wherein said permeate compartment is in contact with said means for removing permeate from said assembly and said first end plate comprises at least one permeate through-hole disposed therein and in contact with both said permeate chamber and said permeate compartment.

21. The assembly according to claim 20 wherein said base unit further comprises a means for supplying power to said ultraviolet lamp.

22. The assembly according to claim 20 wherein said integrated filtration and sterilization cartridge further comprises a counter current sleeve disposed between said ultraviolet lamp and the inner surface of said filtration member.

23. The assembly according to claim 22 wherein said permeate through-hole in said first end plate is disposed between said ultraviolet lamp and said inner surface of said counter current sleeve and in contact with said permeate chamber.

24. The assembly according to claim 20 wherein said filter member is affixed to said first and second end plates by means of an adhesive material.

25. The assembly according to claim 20 wherein said ultraviolet lamp is disposed within a quartz tube.

26. The assembly according to claim 20 wherein said filter member is formed from at least one material selected from the group consisting of: activated carbon, adsorption resins, ion exchange resins, zeolite, reduction catalysts, paper, polymers, clay, ceramics, metals, nylon, wood pulp, cellulose, cotton, and fibers.

27. The assembly according to claim 20 wherein said filter member is in the form of one of the following: string wound filter, fiber composite molded filter, pleated filter, hollow fiber membrane, spiral wound membrane, and plate and frame membrane.

* * * * *